United States Patent Office 3,050,409
Patented Aug. 21, 1962

---

3,050,409
MANUFACTURE OF REFRACTORY OXIDE COATINGS
Gerhard Bayer, Hinteregg, Zurich, Switzerland, assignor to Owens-Illinois Glass Company, a corporation of Ohio
No Drawing. Filed Nov. 30, 1959, Ser. No. 855,971
7 Claims. (Cl. 117—22)

This invention is related to a method of manufacturing refractory coatings. In particular it is concerned with the preparation of refractory coatings on metals and refractories.

It is well known that glazes or coatings may be formed on ceramic and metallic objects in a number of ways. For example, a glaze may be applied by simply fusing the desired oxides and silicates and thereafter spraying the resulting complex mixture on the desired ceramic or metallic object. Again the coating may be prepared in the form of a slurry and thereafter painted on the ceramic or metallic object desired to be coated. The thus painted object may then be placed in a kiln and heated until the coating melts and uniformly distributes itself over the object. However, objects coated by the above methods do not develop the requisite hardness and resistance to corrosion and thermal shock. Accordingly it is an object of this invention to provide a novel process for the manufacture of coated metallic and ceramic objects. A further object of this invention is to provide an economical and simple process for coating metallic and ceramic objects. Another object of this invention is to provide a method of coating a refractory through the chemical reaction of metallic oxide and a metal, which reaction is controlled by means of a retarder. A still further object is to provide a method of coating metallic and ceramic articles whereby the resulting product is characterized by being very hard and resistant to corrosion and thermal shock. An additional object is to provide a refractory coating in which the normal glass phase is replaced by a metallic phase which serves as a binder. A more specific object is to provide a process for the preparation of a ceramic coating which is characterized by having improved conductivity due to the presence of the aforementioned metal phase. These and other objects will be apparent from the description hereinafter.

The novel process of this invention comprises modifying the well known Thermit or Goldschmidt process for the purpose of forming refractory coatings on metallic and ceramic objects. This is effected by applying the oxide-metal Thermit mixture to the article to be coated and applying an igniter such as a hot flame, electric arc, or chemical fuse cap to the mixture which results in a highly exothermic reaction to take place whereby the mixture is fused and distributes itself uniformly over the article to form a coating thereover.

A simplified flow diagram of the above method is as follows:

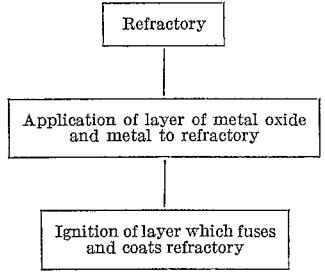

More specifically the foregoing reaction can be accomplished in several ways. In one modification the oxide-metal mixture can be applied directly to the refractory or metal to be coated by painting or pressing the mixture on the surface thereof. Preferably the surface to be coated should be roughened and the coating should be about 3–5 mm. in thickness. However, it is obvious that a coating of 1 mm. to 2 cm. or more in thickness can be applied to the surface to be coated if found desirable. Ignition of the coating can be effected by either igniting at one spot thereof whereby reaction will propagate itself to envelop the entire coating or by inserting the coated article into a furnace preheated at 2200° F. In another modification, which is preferred, the article to be coated is covered with oxide (e.g., $TiO_2$, NiO plus $SiO_4$, etc.), and fired to 2200° F. Onto this hot oxide the metal powder (e.g., Al, Mg, etc.) is sprayed by a gun apparatus in a neutral atmosphere (e.g., A, He, etc.) and an exothermic reaction takes place immediately when the metal particles strike the hot oxide. A further modification involves spraying the metal-oxide Thermit mixture on the article to be coated which is preheated to a temperature of around 2200° F. In this modification it is essential that the metal and oxide particles have the same mass which means that the less dense component should have a larger grain size.

Representative of the refractories which can be satisfactorily coated by the novel process of this invention are alundum, bauxite brick, chrome brick, fire clay brick, and the like.

A method which has been found to be particularly suitable to produce refractory coatings on metals contemplates a first step which involves the oxidation of the metal to be coated (e.g., Fe, Ni, Co, Sn, Mn, and Cr). In the case of iron the metal is heated to 2200° F., and the hot surface thereof is sprayed with aluminum which immediately reacts with the oxide layer (e.g., $Fe_2O_3$) to form $Al_2O_3$. The oxide layer is reduced to the original metal ($Fe_2O_3 + 2Al \rightarrow 2Fe + Al_2O_3$). As a result a dense and firmly adhering $Al_2O_3$ coating is formed on the metal (e.g., Fe) thereby preventing its oxidation or rusting.

In general it has been found that the most satisfactory and uniform coatings are prepared if the metal oxide materials are in fine powder form, e.g., pass 325 mesh sieve. In addition with certain metal oxide Thermit mixtures it has been noted that the resultant reaction is so exothermic that the use of a retarder or diluent is found desirable. In this connection zirconium silicate has been found most suitable as a retarder and prevents segregation of the metal phase from the ceramic phase in the final product. In general the metallic phase of the finished coating amounts to 20% to 40% by weight and serves not only as a binder but increases thermal shock, hardness, and corrosion resistance.

It is to be further noted that refractory bodies per se can be made by the Thermit process as disclosed in this application. In general the mixture of metal and oxide (plus retarder, if necessary) is dry pressed and ignited at its surface by suitable means devised for this purpose such as a hot flame, electric arc or chemical fuse cap. Typical equations for the formation of these dense hard refractories are the following:

(1) Without retarder (a) $2Al + Fe_2O_3 \rightarrow 2Fe + Al_2O_3$
(b) $2Al + B_2O_3 \rightarrow 2B + Al_2O_3$
(c) $3Mg + WO_3 \rightarrow W + 3MgO$
(d) $2Al + Cr_2O_3 \rightarrow 2Cr + Al_2O_3$
(e) $4Al + 3MnO_2 \rightarrow 3Mn + 2Al_2O_3$
(f) $5Al + 3NiO \rightarrow 3NiAl + Al_2O_3$
(g) $6Mg + B_2O_3 \rightarrow Mg_3B_2 + 3MgO$
(h) $8Al + 3TiO_2 \rightarrow Ti_3Al_4 + 2Al_2O_3$ (2) With retarder (i) $5Al + 3NiO + 3ZrSiO_4 \rightarrow 3NiAl + Al_2O_3 + 3ZrSiO_4$ It is to be understood that the metallic or binding phase, whether a refractory per se or a coating for a metallic or ceramic article, produced by this process not only includes metals (Equations 1a–1e above) but intermetallic compounds such as aluminides and borides (Equations 1f–1h above). No special conditions of pressure are needed for the process of this invention since all the reactions can be carried out under normal atmospheric pressure. Metals which can be employed include magnesium, aluminum, silicon and zirconium. The oxides which are reacted with the above metals include iron oxide, titanium oxide, nickel oxide, tungsten oxide, manganese oxide, boron oxide, and chromium oxide.

The superior coatings obtained by the process of this invention are believed to be due to (a) the ratio of metallic phase (20 to 40 percent by weight) to ceramic phase (60 to 80 percent by weight) and (b) the violent reactions under which the oxide and metal are combined in which more than simple melting or fusion is involved but an involved complex is formed. Thus the process of this invention provides a new method for the in situ formation of hard, dense, high temperature resistant coatings on metallic and ceramic articles. Other modifications of the novel method of this invention will be apparent to those skilled in the art and are included within the scope of the invention as claimed.

What I claim is:

1. In a method of forming a firmly adhering coating on ceramic refractory bodies in which the coating has a metallic phase of 20 to 40 percent by weight and a ceramic phase of 60 to 80 percent by weight, the steps including applying a layer comprising an (a) oxide selected from the group consisting of iron oxide, titanium oxide, nickel oxide, tungsten oxide, boric oxide, manganese oxide, and chromium oxide and (b) a metal selected from the group consisting of aluminum, silicon, zirconium, and magnesium; and thereafter igniting the layer whereby sufficient heat is exothermically developed from the chemical interaction of the metal and oxide as to fuse the layer to form a dense hard coating.

2. In a method of forming a coating on refractory bodies in which the coating has a metallic phase of 20 to 40 percent by weight, the steps including applying a layer comprising an (a) oxide selected from the group consisting of iron oxide, titanium oxide, nickel oxide, tungsten oxide, boric oxide, manganese oxide, and chromium oxide, (b) zirconium silicate as a retarder, and (c) a metal selected from the group consisting of aluminum, silicon, zirconium, and magnesium; and thereafter igniting the layer whereby sufficient heat is exothermically developed from the chemical interaction of the metal and oxide as to fuse the layer to form a dense hard coating.

3. The method of claim 2 in which the layer of metal and oxide is applied by painting a mixture of the metal and oxide on the body to be coated.

4. The method of claim 2 in which the layer of metal and oxide is applied by first covering the body to be coated with the oxide while maintaining the body at a temperature of at least 2200° F. and thereafter spraying the metal as a fine powder on to the oxide.

5. The method of claim 2 in which the layer of oxide and metal are sprayed on to the body to be coated while the body is maintained at a temperature of at least 2200° F.

6. The process of claim 2 in which the refractory body is selected from the group consisting of Alundum, bauxite brick, chrome brick, and fire clay brick.

7. In a method of forming a firmly adhering coating on ceramic refractory bodies selected from the group consisting of Alundum, bauxite, chrome and fire clay in which the coating has a metallic phase of 20 to 40 percent by weight and a ceramic phase of 60 to 80 percent by weight, the steps including applying a layer comprising an (a) oxide selected from the group consisting of iron oxide, titanium oxide, nickel oxide, tungsten oxide, boric oxide, manganese oxide, and chromium oxide and (b) a metal selected from the group consisting of aluminum, silicon, zirconium, and magnesium; and thereafter igniting the layer whereby sufficient heat is exothermically developed from the chemical interaction of the metal and oxide as to fuse the layer to form a dense hard coating.

References Cited in the file of this patent
UNITED STATES PATENTS

| | | |
|---|---|---|
| 2,072,719 | Pearsall | Mar. 2, 1937 |
| 2,463,342 | Wiczer | Mar. 1, 1949 |
| 2,496,971 | Wiczer | Feb. 7, 1950 |
| 2,775,531 | Montgomery | Dec. 25, 1956 |
| 2,835,967 | Umbia | May 27, 1958 |
| 2,902,756 | Cavanaugh | Sept. 8, 1959 |
| 2,904,449 | Bradstreet | Sept. 15, 1959 |
| 2,955,958 | Brown | Oct. 11, 1960 |